(12) United States Patent
Jones et al.

(10) Patent No.: US 8,310,940 B2
(45) Date of Patent: Nov. 13, 2012

(54) TESTING UPSTREAM CABLE CHANNELS

(75) Inventors: Richard Earl Jones, Plainfield, IN (US);
Ching-Chang Liao, Fishers, IN (US);
Daniel K. Chappell, Greenwood, IN (US)

(73) Assignee: JDS Uniphase Corporation, Milpitas, CA (US)

(*) Notice: Subject to any disclaimer, the term of this patent is extended or adjusted under 35 U.S.C. 154(b) by 317 days.

(21) Appl. No.: 12/793,643

(22) Filed: Jun. 3, 2010

(65) Prior Publication Data

US 2010/0309805 A1    Dec. 9, 2010

Related U.S. Application Data

(60) Provisional application No. 61/184,222, filed on Jun. 4, 2009.

(51) Int. Cl.
*H04L 12/28* (2006.01)
*H04B 3/46* (2006.01)
*H04N 7/173* (2006.01)
*H04N 17/00* (2006.01)

(52) U.S. Cl. ........ 370/241; 370/431; 375/224; 725/107; 348/192

(58) Field of Classification Search ............... 370/241, 370/252, 253, 248, 431, 459; 375/224–228; 725/105, 107; 348/192, 193
See application file for complete search history.

(56) References Cited

U.S. PATENT DOCUMENTS

| | | | |
|---|---|---|---|
| 5,943,604 A | 8/1999 | Chen et al. | 455/5.1 |
| 7,246,368 B1 * | 7/2007 | Millet et al. | 725/111 |
| 7,486,722 B2 * | 2/2009 | Brommer et al. | 375/222 |
| 2003/0108112 A1 * | 6/2003 | Rudolph et al. | 375/261 |
| 2005/0047442 A1 | 3/2005 | Volpe et al. | 370/480 |

* cited by examiner

*Primary Examiner* — Kerri Rose
(74) *Attorney, Agent, or Firm* — Matthew A. Pequignot; Pequignot + Myers LLC

(57) ABSTRACT

In order to measure the performance of a DOCSIS upstream channel as well as to locate impairments, a special test signal is transmitted in a time slot of the upstream channel by a test instrument positioned anywhere within the CATV plant. A second test instrument, located at the termination point of the upstream plant, then detects, recovers, and processes the test signal in order to complete the measurement. The typical methods used to detect and recover bursted signals within a DOCSIS upstream channel use precise timing information transmitted in a corresponding DOCSIS downstream channel. Unfortunately, the downstream channel and thus the precise timing information are not always available to the secondary test instrument. The present invention also describes an apparatus and method for detecting a bursted test signal without the use of the DOCSIS upstream channel timing.

13 Claims, 13 Drawing Sheets

TESTING UPSTREAM CABLE CHANNELS

CROSS-REFERENCE TO RELATED APPLICATIONS

The present invention claims priority from United States Patent Application No. 61/184,222, filed Jun. 4, 2009, the entirety of which is incorporated herein by reference.

TECHNICAL FIELD

The present invention relates to a system for testing upstream cable channels, and in particular to a system for testing upstream Data Over Cable Service Interface Specification (DOCSIS) upstream cable channels during normal operation.

BACKGROUND OF THE INVENTION

Figure 1:
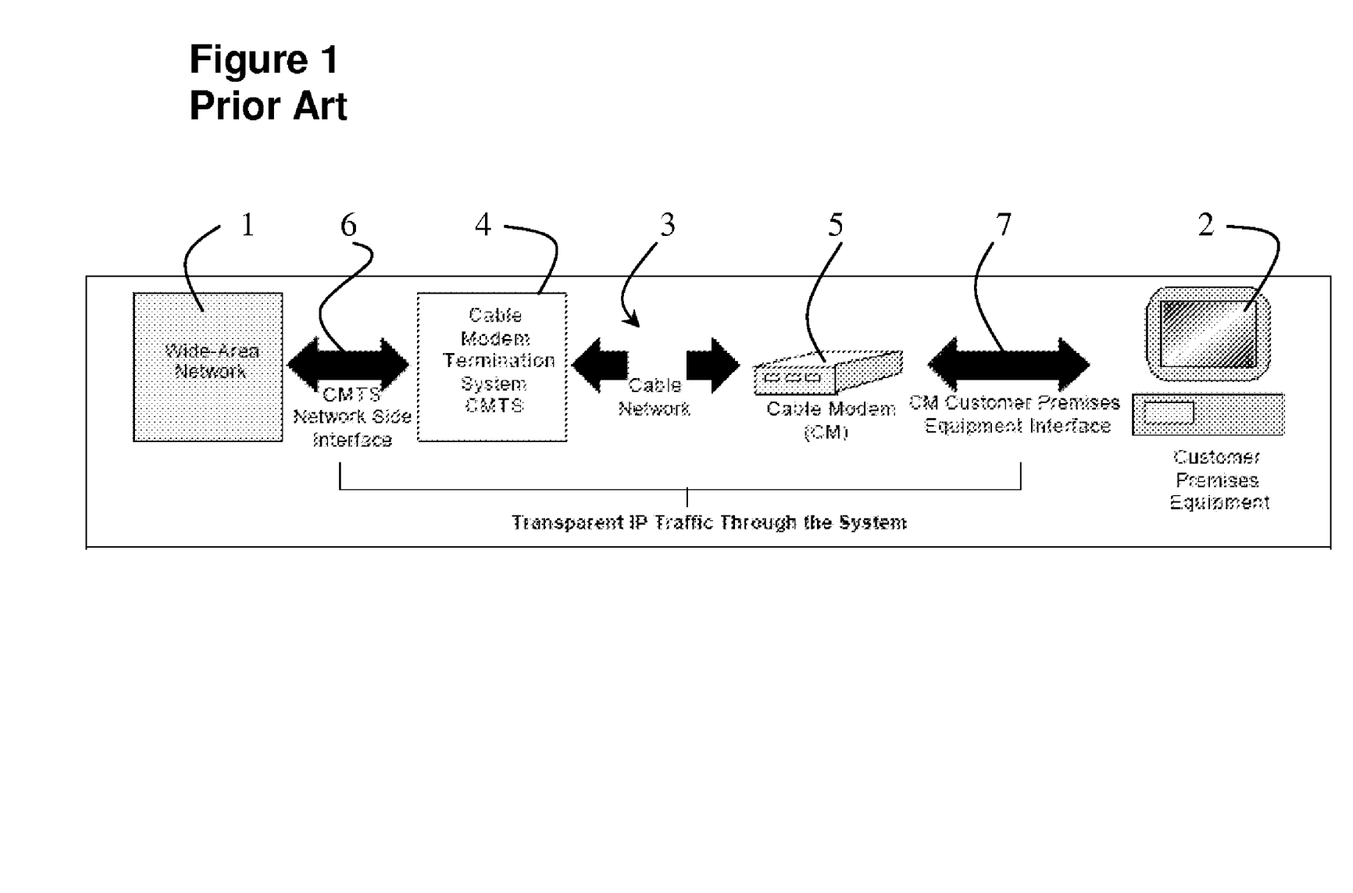
FIG. 1 is a schematic representation of transparent IP traffic through a conventional Data-Over-Cable-System.
Figure 2:
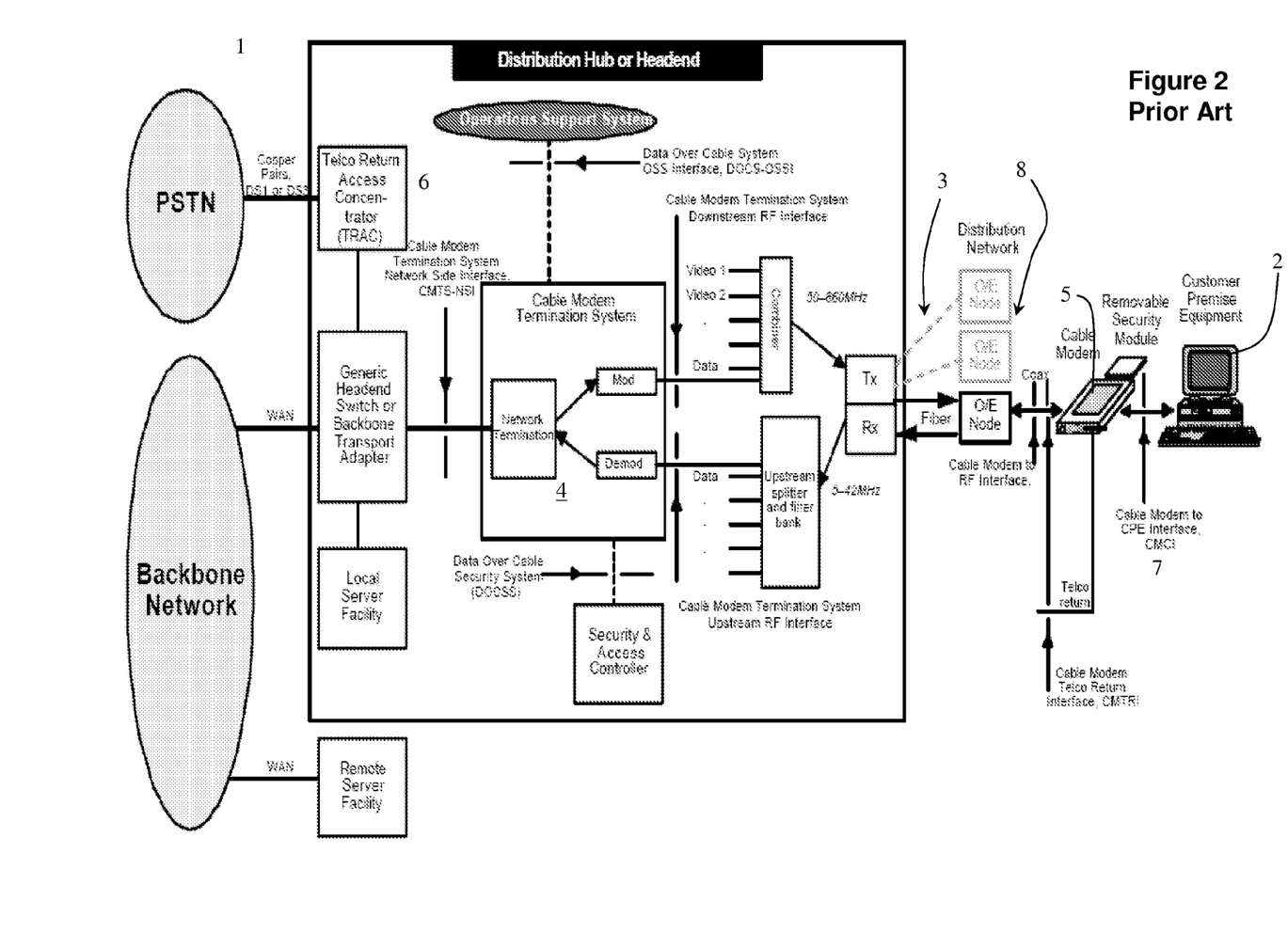
FIG. 2 is a schematic representation of a conventional architecture for the data-over-cable services and interfaces.

Data Over Cable Service Interface Specification (DOCSIS) is a standard developed by CableLabs, which allows transparent bi-directional transfer of Internet Protocol (IP) traffic, between the cable system headend 1 and customer locations 2, over an all-coaxial or hybrid fiber/coax (HFC) cable network 3, illustrated schematically in FIG. 1.

The transmission path over the cable system is realized at the headend by a Cable Modem Termination System (CMTS) 4, and at each customer location by a Cable Modem (CM) 5. At the headend 4 (or hub), the interface to the data-over-cable system is called the Cable Modem Termination System—Network-Side Interface 6 (CMTS-NSI). At the customer locations, the interface is called the cable-modem-to-customer-premises-equipment interface 7 (CMCI). The intent is for operators to be able to transparently transfer IP traffic between the CMTS NSI interface 6 and the CMCI interface 7, including but not limited to datagrams, dynamic host configuration protocol (DHCP), internet control message protocol (ICMP), and IP Group addressing (broadcast and unicast).

The DOCSIS upstream channel uses a frequency domain/time domain multiple access (FDMA/TDMA) burst modulation format, which supports multiple symbol rates and formats (QPSK, xQAM). The modulation format includes pulse shaping for spectral efficiency, is carrier-frequency agile, and has selectable output power level. Each burst is variable in length and supports a flexible modulation, symbol rate, preamble, randomization of payload, and programmable forward error correction (FEC) encoding. The burst timing is very precise and always begins on boundaries spaced at integer multiples of 6.25 μsec.

All of the upstream transmission parameters associated with burst transmission outputs from the cable modem 5 are configurable by the CMTS 4 via media access controller (MAC) messaging. Many of the parameters are programmable on a burst-by-burst basis.

The upstream channel can support a near-continuous mode of transmission, wherein ramp-down of one burst may overlap the ramp-up of the following burst, so that the transmitted envelope is never zero. The system timing of the TDMA transmissions from the various cable modems 5 guarantees that the center of the last symbol of one burst and the center of the first symbol of the preamble of an immediately following burst are separated by at least the duration of five symbols.

An upstream modulator is part of each cable modem 5, which interfaces with the cable network 3 via coax cable and conveniently located nodes 8, which convert the RF signals to optical signals for hybrid optical/electrical networks. The upstream modulator contains the actual electrical-level modulation function and the digital signal-processing function. The digital signal-processing function provides the forward error correction (FEC), preamble prepend, symbol mapping, and other processing steps.

The CMTS 4 includes a receiver Rx for receiving the upstream channels from the fiber (or cable) network 3, and an upstream filter splitter and filter bank, which forms an upstream RF interface for the CMTS 4. The upstream splitter and filter bank separates the upstream signal into individual channels, and directs the individual channels to a demodulator Demod in the CMTS 4. The CMTS 4 accesses the various networks 1, e.g. Telco, TV, DATA, via the CMTS-NSI 6. The CMTS 4 also controls modulation of downstream channels via a CMTS downstream RF interface.

Figure 3:
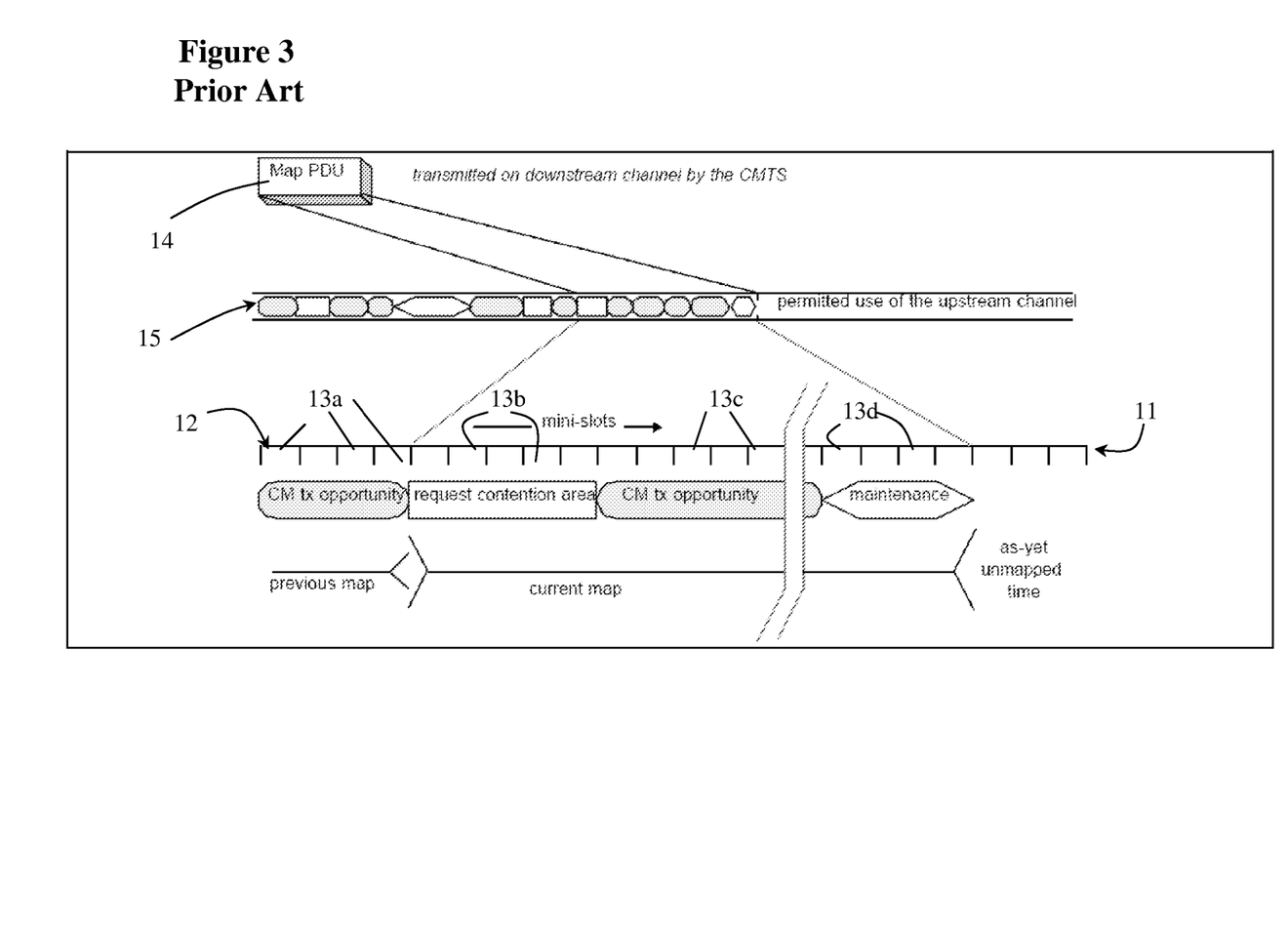
FIG. 3 is a schematic representation of an upstream channel and a downstream channel.

With reference to FIG. 3, the upstream channel 11 is modeled as a stream of mini-slots 12. The CMTS 4 generates the time reference for identifying the mini-slots 12, and controls access to the mini-slots 12 by the cable modems 5 using an allocation map mechanism. For example, the CMTS 4 may grant some number of contiguous slots to a cable modem 5, upon a request therefrom, for the cable modem 5 to transmit a data protocol data unit (PDU). The granted time slots may be of arbitrary length from a few tens of microseconds to a few milliseconds. The cable modem 5 must time the transmission so that the CMTS 4 receives the transmission in the time reference specified.

The CMTS 4 continuously generates allocation maps that describes the uses of the mini-slots 12 of the upstream channel 11 for a specific time interval and broadcasts the allocation maps to all cable modems 5 in MAC Management messages in a Map PDU 14 on a downstream channel 15. A given map describes how a plurality of contiguous mini-slots 12 are to be used by the CMs 5 and how the CMs 5 should access them, e.g. some mini-slots 13a as grants for particular cable modems 5 to transmit data in, other mini-slots 13b as available for contention transmission, and other mini-slots 13c as an opportunity for new cable modems to join the link. Among the time slots mapped by the CMTS is a slot called the "station maintenance" time slot (SMTS) made up of 3 to 5 mini-slots 13d. In many implementations, each cable modem receives at least one SMTS every 30 seconds. When a cable modem 5 receives an SMTS it must transmit a ranging request (RNG-REQ) message which is used by the CMTS 4 in order to determine if the cable modem 5 is operational and to maintain the link to that cable modem. If the cable modem 5 does not respond to the SMTS after 16 tries the cable modem 5 is assumed to be off.

Figure 4:
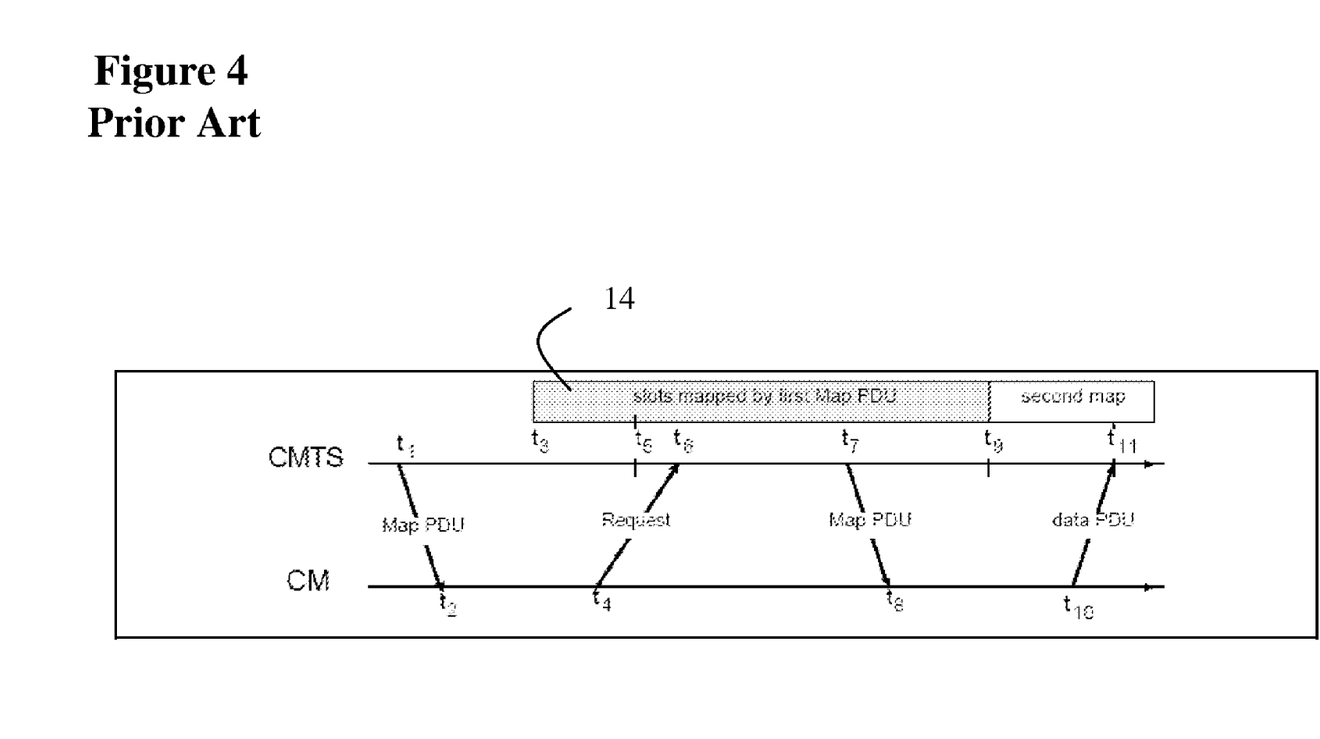
FIG. 4 illustrates an interchange between a CM and a CMTS when the CM has data to transmit.

FIG. 4 illustrates the interchange between one of the CM's 5 and the CMTS 4 when the CM 5 has data to transmit to the CMTS 4. At time $t_1$, the CMTS 4 transmits a map PDU 14, whose effective starting time is $t_3$, on the downstream channel 15. Within the map PDU 14 is a Request IE which will start at $t_5$. The difference between $t_1$ and $t_3$ is needed to allow for:

a) downstream propagation delay (including FEC interleaving) to allow all CM's 5 to receive the Map PDU 14;

b) processing time at the CM's 5, which enables the CM's 5 to parse the Map PDU 14 and translate it into transmission opportunities; and c) upstream propagation delay, which enables the CM's transmission of the first upstream data to begin in time to arrive at the CMTS 4 at time $t_3$.

At $t_2$, the CM 5 receives the map PDU 14 and scans it for request opportunities. In order to minimize request collisions, the CM 5 calculates $t_6$ as a random offset based on the Data Backoff Start value in the most recent Map PDU 14.

At $t_4$, the CM 5 transmits a request for as many mini-slots 12 as needed to accommodate a data PDU for the CMTS 4.

Time $t_4$ is chosen based on the ranging offset so that the request will arrive at the CMTS 4 at $t_6$.

At $t_6$, the CMTS 4 receives the request and schedules it for service in the next map.

At $t_7$, the CMTS 4 transmits a map PDU 14 with details of a map, whose effective starting time is $t_9$. Within this map, a data grant for the CM 5 will start at $t_{11}$.

At $t_8$, the CM 5 receives the map PDU 14 and scans for its data grant.

At $t_{10}$, the CM 5 transmits the data PDU so that it will arrive at the CMTS 4 at $t_{11}$. Time $t_{10}$ is calculated from the ranging offset as in step 3.

At step 3, the request may collide with requests from other CM's 5 and be lost. The CMTS 4 does not directly detect the collision. The CM 5 determines that a collision (or other reception failure) occurred when the next map fails to include acknowledgement of the request. The CM 4 must then perform a back-off algorithm and retry.

U.S. Pat. No. 5,943,604, entitled Echo Device for Locating Upstream Ingress Noise Gaps at Cable Television Head Ends issued Aug. 24, 1999 to Chen et al, relates to a system for identifying a transmission frequency that has less noise than other available frequency bands. The Chen et al reference requires a special packet generator, rate controller, echo device, demodulator and packet checker simply to compare noise on various upstream channels.

U.S. Pat. No. 7,246,368, entitled Cable Plant Certification Procedure Using Cable Modems issued Jul. 17, 2007 to Millet et al, relates to a system for testing the power levels of various frequencies during periods of time when the cable modem is not transmitting normal data, e.g. when the SMTS indicates a cable modem is not transmitting. Unfortunately, many networks do not have enough down time to test all of the upstream channels adequately.

United States Patent Application No. 2005/0047442 published Mar. 3, 2005 in the name of Volpe et al, relates to analyzing an upstream channel, and includes identification of the cable modem of origin based on timing information derived from a predetermined database.

An object of the present invention is to overcome the shortcomings of the prior art by providing testing system, which performs a wide range of tests during normal operation of the cable modem.

SUMMARY OF THE INVENTION

Accordingly, the present invention relates to a method of testing an upstream DOCSIS channel with a test signal transmitted within mini-slots allocated for contention transmission or data PDUs during normal operation of a cable modem in transmission to a CMTS comprising:

a) generating the test signal with a testing device including a cable modem;

b) sending a request signal to the CMTS using the cable modem for as many mini-slots in the DOCSIS upstream channel as required to send the test signal;

c) receiving a map PDU from the CMTS with details of a map, within which is a data grant for the mini-slots requested in step b);

d) transmitting the test signal in the mini-slots granted by the CMTS;

e) receiving the test signal at a test signal collection unit; and f) performing tests using the test signal.

BRIEF DESCRIPTION OF THE DRAWINGS

The invention will be described in greater detail with reference to the accompanying drawings which represent preferred embodiments thereof, wherein.

DETAILED DESCRIPTION

The upstream path of the current Cable Television Data-Over-Cable Service Interface Specification (CATV DOCSIS) communication scheme can be impaired for various reasons. The fundamental idea behind the present invention is that a desired test signal may be transmitted from a primary test device 35, 45, 55 or 65 to a secondary test device 20 within a time slot or mini-slots 13a to 13d allocated for contention transmission or data PDUs during normal operation of the cable network. In the case of a contention time slot, the test signal may be transmitted directly within the time slot. The advantage to using this type of time slot is that they tend to be longer in duration and it can be done without the use of a fully compliant cable modem. The disadvantages are that there is a chance for a collision with another cable modem and the frequency of the time slots can be relatively low.

Figure 5:
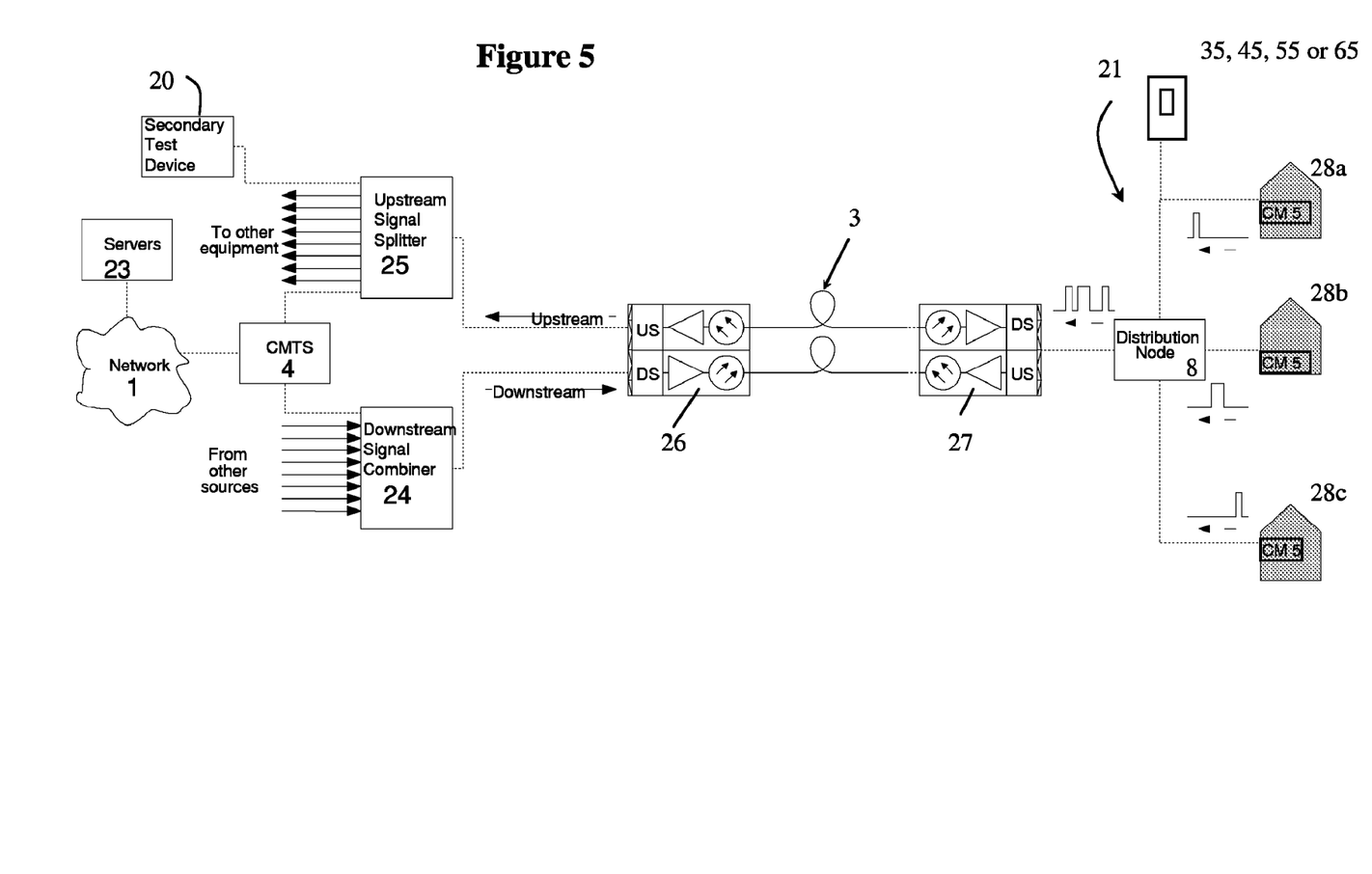
FIG. 5 is a schematic representation of a cable network including the testing system in accordance with the present invention.

With reference to FIG. 5, in order to use a data PDU time slot, a designated primary test equipment 35, 45, 55 or 65 connected anywhere within a cable plant 21, must first transmit a request to the CMTS 4 for as many mini-slots as needed to accommodate a test signal 22. Once this request is granted, the test signal 22 may be transmitted within the designated data PDU time slot mini-slots 13a to 13d.

Typically the CMTS 4 includes three connections: 1) a network interface to servers 23 via the internet; 2) downstream control and data delivery via the downstream signal combiner 24; and 3) upstream control and data reception via the upstream signal splitter 25. FIG. 5 illustrates one "Node" 8 of a CATV plant 21, which serves up to 200 homes with DOCSIS service. Often a "Hub" will have over one hundred nodes and a city the size of Indianapolis can have five or six hub sites.

The downstream signal of the CMTS 4 is coupled with the other signals, e.g. TV, Test, Telephony or others, via the Signal Combiner 24. The output of the Signal Combiner 24 is connected to a Fiber Transceiver Node 26, which converts the combined downstream signal suite from RF signals to optical signals, and delivers the combined signal suite to a remote location via a fiber optic link 3. The downstream optical signals are converted back to RF signals at a Transceiver Node 27, which is also optically coupled to the optical link 3. The RF signals from the transceiver node 27 are delivered to different residences via the cable distribution node 8. Certain residences 28a, 28b and 28c use cable modems 5, customer premises equipment interface 7, and customer premises equipment 2. A control signal from the CMTS 4 is detected and demodulated by each of the cable modems 5.

When one of the primary test equipment 35, 45, 55 or 65, wants to talk back to the CMTS 4 in preparation of sending the test message 21, the primary test equipment 35, 45, 55 or 65 will wait until the CMTS 4 indicates that the upstream path is free, the cable modem within the primary test equipment 35, 45, 55 or 65 then requests a time slot from the CMTS 4 via an upstream signal 15. The upstream signal 15 is coupled to the distribution node 8, and then converted to an optical signal at the fiber transceiver 27. The upstream optical signal travels back to the hub site or head-end via optical cable link 3, where a fiber transceiver 26 optically connected to the optical cable link 3, converts the upstream optical signal back to an RF signal. The upstream RF signal is then routed to the signal splitter 25, where a portion of the upstream signal is sent to the CMTS 4. The CMTS 4 thus becomes a link between the primary test equipment 35, 45, 55 or 65 and the secondary test device 20.

The interchange between the primary test equipment 35, 45, 55 or 65 and the CMTS 4 when the primary test equipment 35, 45, 55 or 65 has data to transmit to the CMTS 4 ideally has similar timing to the exchange illustrated in FIG. 4, but other timings are possible. Repeatedly, the CMTS 4 transmits a map PDU 14 on the downstream channel 15. Within the map PDU 14 is a Request IE. The primary test equipment 35, 45, 55 or 65 receives the map PDU 14 and scans it for request opportunities. In order to minimize request collisions, the primary test equipment 35, 45, 55 or 65 ideally calculates the arrival time of the request at the CMTS 4 as a random offset based on the Data Backoff Start value in the most recent Map PDU 14. The primary test equipment 35, 45, 55 or 65 transmits a request for as many mini-slots 12 as needed to accommodate a test signal PDU for the CMTS 4. The CMTS 4 receives the request and schedules it for service in the next map. The CMTS 4 transmits a map PDU 14 with details of the next map. Within this map, a data grant for the primary test equipment 35, 45, 55 or 65 will start at a designated time. The primary test equipment 35, 45, 55 or 65 receives the map PDU 14 and scans for its data grant. The primary test equipment 35, 45, 55 or 65 then transmits the test signal PDU so that it will arrive at the CMTS 4 at a desired time.

The request may collide with requests from other CM's and be lost, and unfortunately, the CMTS 4 does not directly detect the collision. The primary test equipment 35, 45, 55 or 65 determines that a collision (or other reception failure) occurred when the next map fails to include acknowledgement of the request. The primary test equipment 35, 45, 55 or 65 must then perform a back-off algorithm and retry.

Figure 6:
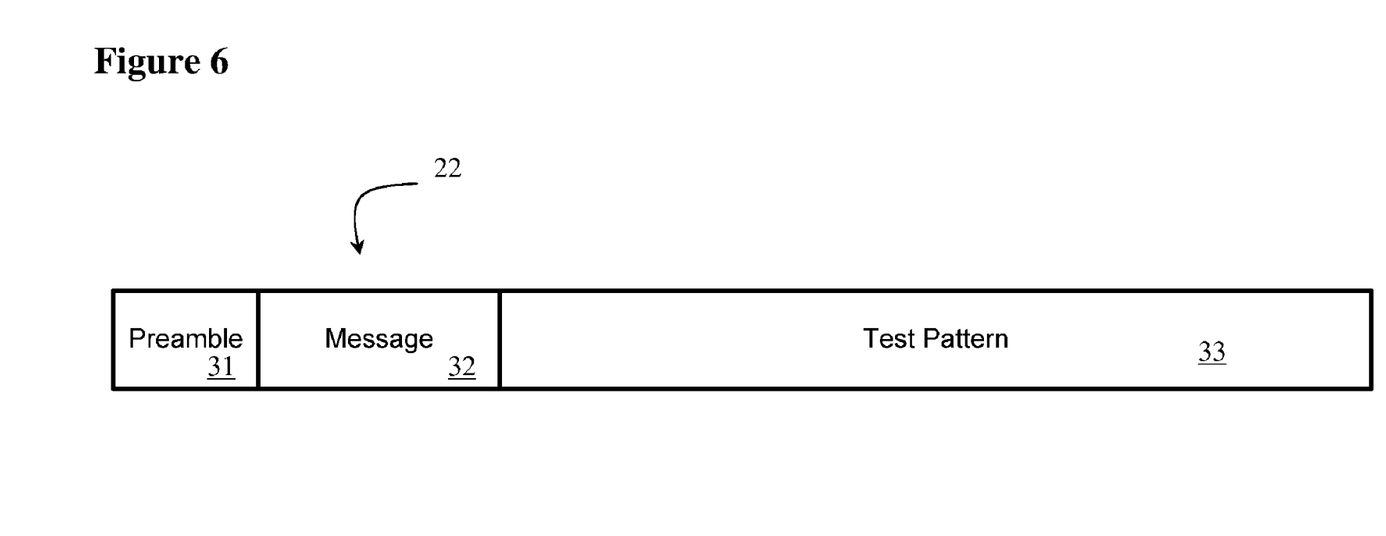
FIG. 6 is a schematic representation of a test cable modem in accordance with the present invention.

With reference to FIG. 6, the test signal 22 may take many forms, depending on the test being performed. In general, it may contain a preamble 31, a message 32, and a test pattern 33. The preamble 31 allows for the test signal 22 to be detected and recovered by any device that is processing the test signal 22. The message 32 contains information, such as the unique ID of the test cable modem 35, 45, 55 or 65 inserting the signal and a description of the test pattern. Finally, the test pattern 33 is specific to the test being performed and may be a CW for frequency response tests, modulation symbols for MER tests, and no test pattern for noise floor and ingress tests. For frequency response tests, a CW at a known power level is inserted at specific frequencies within the channel's bandwidth and measured by the secondary test device to determine the inband frequency response. For MER tests, a known set of symbols are transmitted which allows the secondary test device to measure the MER per the ETR101-290 specification. For noise floor and ingress tests, a swept power level is measured where the power is measured at specific frequencies within the channels bandwidth when no DOCSIS or test signals are present. The ingress test involves performing limit checks on the measured power.

The present invention may be implemented using one of several different system architectures. The first embodiment illustrated in FIG. 7, includes the cable modem 35 with a fully compliant cable modem chip set 36 controlled by a CPU 37 to generate the test signal 22 directly. In this case, the modem chip set 36 must allow the transmit parameters of the DOCSIS contention and data PDU bursts to be modified to the point that the desired test signal 22 can be generated when the time slots are available or granted, which is generally possible with most chip sets 31; however, there is a limit to their flexibility so the types of test signals 22 that can be generated are limited, because they typically are only capable of generating a legally modulated signal based upon a specified data pattern.

Figure 7:
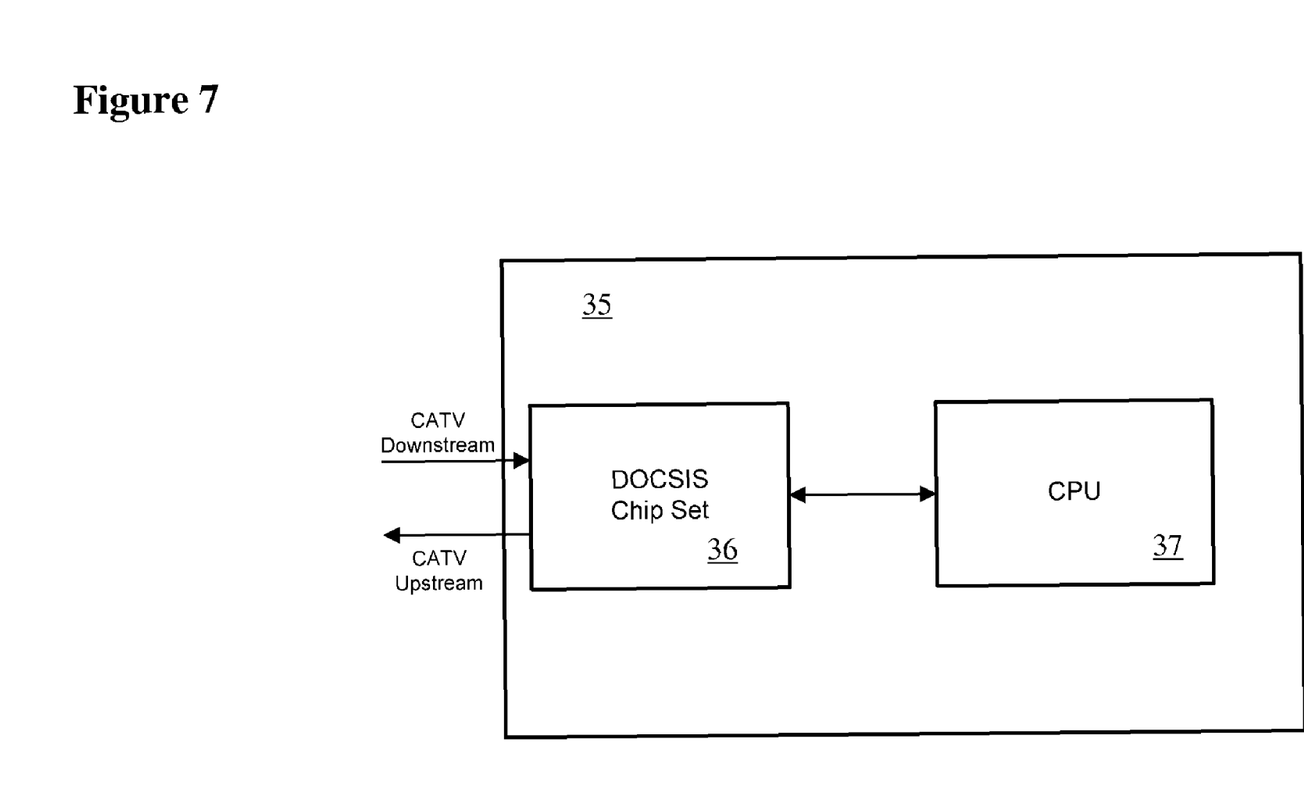
FIG. 7 is a schematic representation of a test cable modem in accordance with the present invention.

With this architecture, the test signal 22 can be transmitted in a contention time slot simply by overriding the normal contention burst parameters and then transmitting the test signal 22 when the time slot occurs. The same process can be followed with a data PDU time slot, but the time slot must first be requested by the DOCSIS chip set 31.

Figure 8:
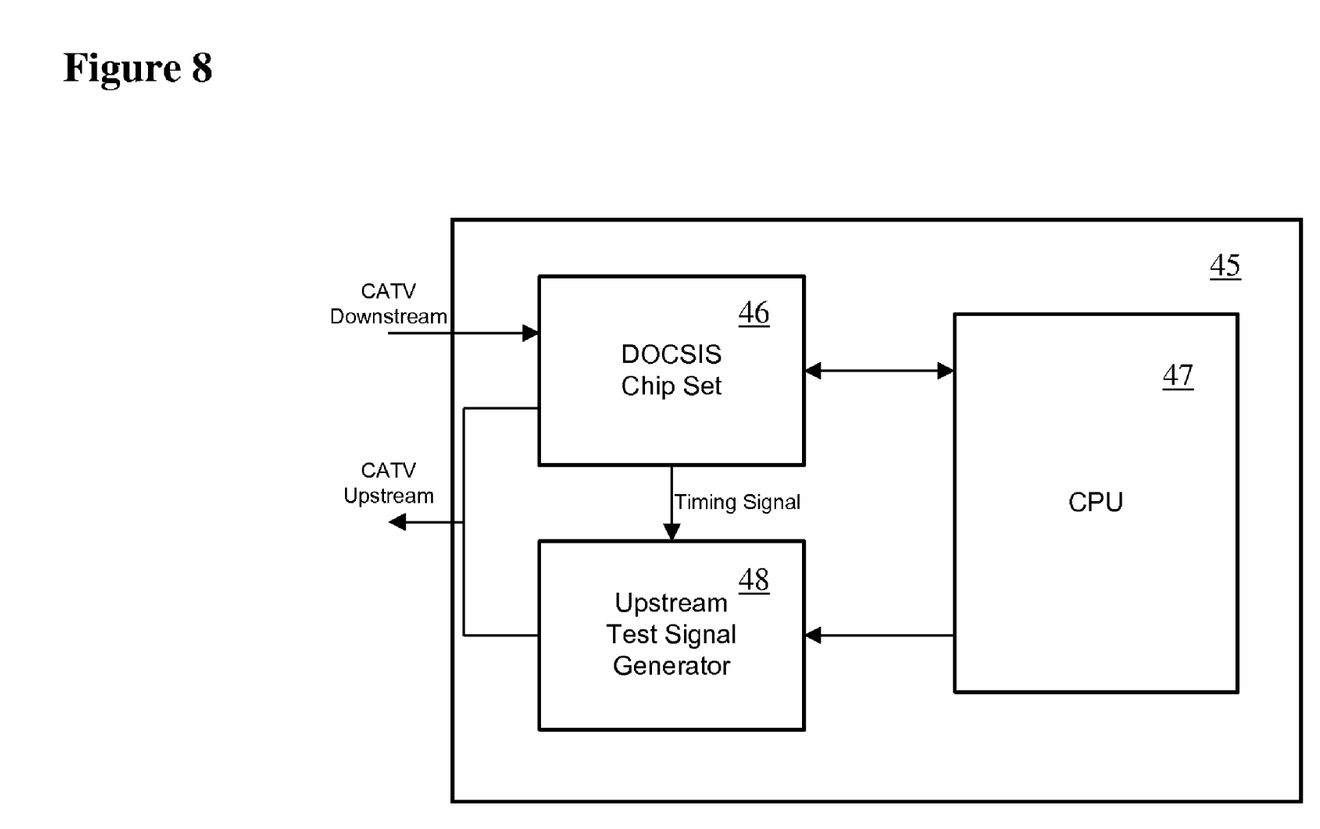
FIG. 8 is a schematic representation of a test cable modem in accordance with the present invention.

With reference to FIG. 8, in cases where a DOCSIS chip set 46 controlled by CPU 47 limits what test signals 22 can be generated, a dedicated upstream test signal generator 48 can be added to cable modem 45. In this case, the DOCSIS chip set 46 is still responsible for requesting and detecting time slots, however, when the desired time slot occurs the upstream test signal generator 48 is signaled by the DOCSIS chip set 46 to transmit the test signal 22.

Figure 9:
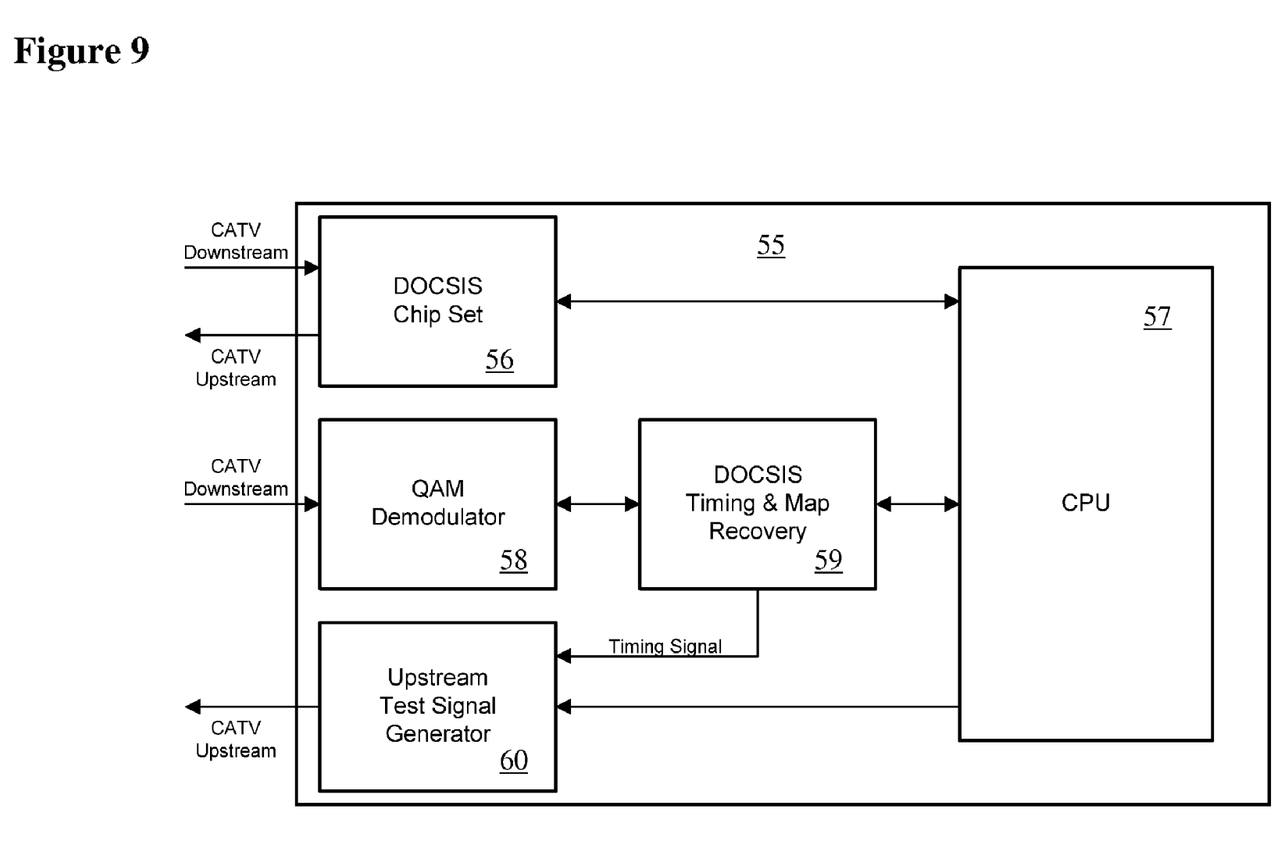
FIG. 9 is a schematic representation of a test cable modem in accordance with the present invention.

A third embodiment of a cable modem 55 in accordance with the present invention, illustrated in FIG. 9, is necessary in the event that a DOCSIS chip 56 set can't generate the desired test signal 22 and doesn't provide access to the time slot timing. In this case, the DOCSIS chip set 56 controlled by CPU 57 is used to acquire the nominal upstream channel parameters (power level, ranging offset, etc.) and request data PDU slots. A separate QAM demodulator 58 and associated logic 59 is used to capture the upstream timing and time slot allocation map 14 broadcast on the downstream channel 15 and to generate the timing signal for the upstream test signal generator 60.

Figure 10:
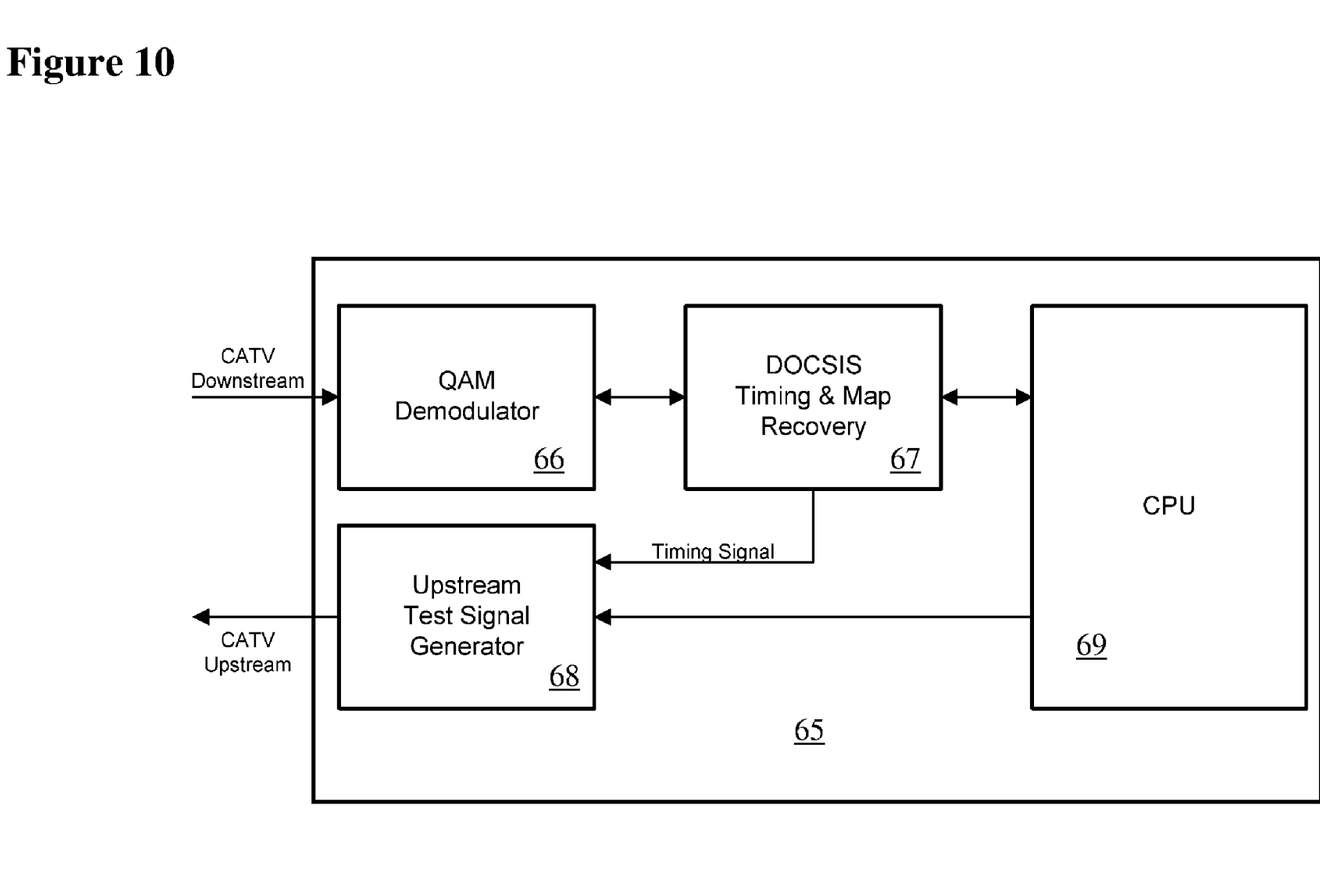
FIG. 10 is a schematic representation of a test signal in accordance with the present invention.
Figure 11:
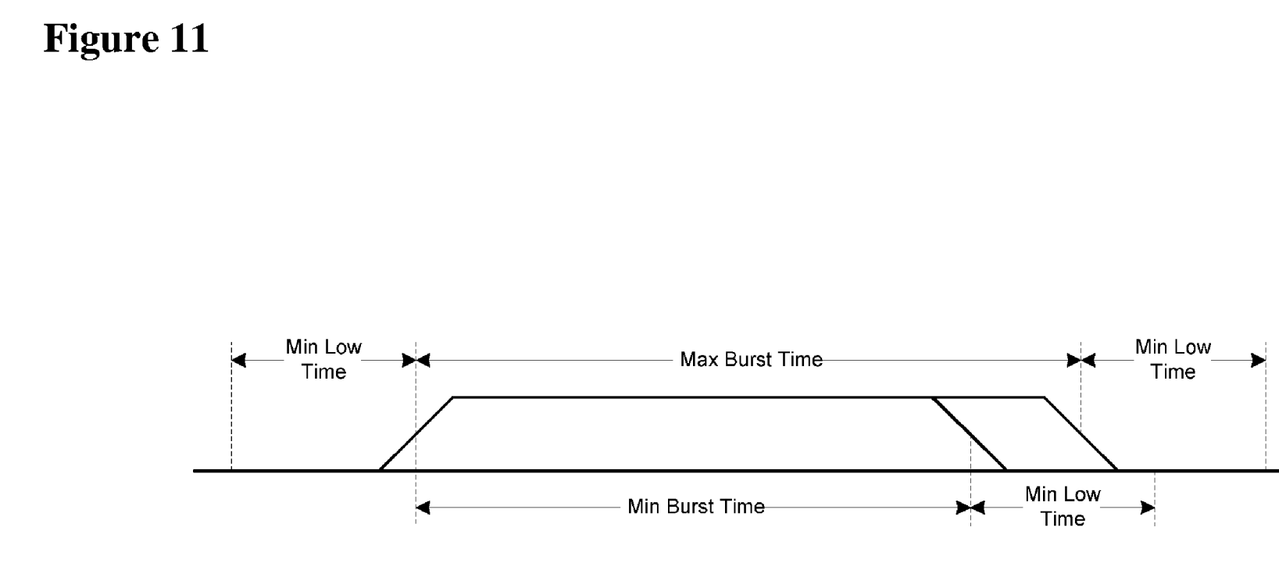
FIG. 11 illustrates a bursted test signal in accordance with the present invention.

A fourth embodiment (FIG. 10) for a test cable modem 65 may be used in cases where a DOCSIS chip set isn't available. The test cable modem 65 comprises a QAM demodulator 66, associated logic 67, and an upstream test signal generator 68, all controlled by CPU 69. The QAM demodulator 66 and the associated logic 67 are used to capture the upstream timing and time slot allocation map 14 broadcast on the downstream channel 15 and to generate the timing signal for the upstream test signal generator 68. Note that this architecture is only capable of transmitting a test signal 22 in a contention based time slot, which is large enough to support unranged burst transmissions.

A secondary test instrument, i.e. a test signal collection unit, located at a termination point of the upstream plant, then detects, recovers, and processes the test signal in order to complete the measurement. The typical methods used to detect and recover bursted signals within a DOCSIS upstream channel use precise timing information transmitted in a corresponding DOCSIS downstream channel. Unfortunately, the downstream channel and thus the precise timing information are not always available to the secondary test instrument. The present invention describes a means for detecting a bursted test signal without the use of the DOCSIS upstream channel timing.

The present invention relates to the detection of a bursted test signal transmitted in a time slot of a DOCSIS upstream channel so that it can be subsequently recovered and processed. It involves detecting all bursts within the DOCSIS upstream channel 11 that have a width between a minimum and maximum time value followed by an autocorrelation operation. The minimum burst time is the time required to transmit the bursted test signal minus the time to transmit N symbols. The maximum burst time is the time required to transmit the bursted test signal plus the time to transmit N symbols. The value of N can be adjusted to get reliable capture of the bursted test signal. It is usually greater than 5 and smaller than 10.

The secondary test instrument 20 includes a bursted signal width detector, which includes a RMS power detector and associated state machine. The RMS power detector calculates the RMS power within the frequency band occupied by the DOCSIS upstream channel 11 and feeds this value into the state machine.

The state machine comprises the following states:

S0: Wait for the power level to drop below a specified threshold and then proceed to state S1. The threshold is usually several dB down from the power level of the bursted test signal. It mainly depends on the type of the test pattern in the bursted test signal and should be adjusted to get reliable capture of the bursted test signal. If the test pattern is the CW signal, the threshold can be 5 dB down from the power level of the bursted test signal. If the QAM signal is used as the test pattern, the threshold should be set much lower. Typically, the threshold is at −19 dBc for QAM64, at −13 dBc for QAM16, and at −7 dBc for QPSK.

S1: Seed a countdown timer with the value "Min Low Time" and continue to monitor the power level. The value of "Min Low Time" can be adjusted to get reliable capture of the bursted test signal. It is usually greater or equal to 0. If the power level exceeds the specified threshold, as above, then return to state S0. Otherwise, wait for the countdown timer to expire and proceed to state S2.

S2: Monitor the power level and proceed to state S3 when it exceeds the specified threshold.

S3: Seed a countdown timer with the value "Min Burst Time" and continue to monitor the power level. The minimum burst time is the time required to transmit the bursted test signal minus the time to transmit N symbols. The value of N can be adjusted to get reliable capture of the bursted test signal. It is usually greater than 5 and smaller than 10. If the power level drops below the specified threshold then return to state S0. Otherwise, wait for the countdown timer to expire and proceed to state S4.

S4: Seed a countdown timer with the value "Max Burst Time—Min Burst Time" and continue to monitor the power level. If the power level drops below the specified threshold then proceed to state S5. If the countdown timer expires then return to state S0.

S5: Seed a countdown timer with the value "Min Low Time" and continue to monitor the power level. If the power level exceeds the specified threshold then return to state S0. Otherwise, wait for the countdown timer to expire and proceed to state S6.

S6: Signal that a bursted signal of the desired width has been detected and return to state S0.

To further detect the bursted test signal 22 from a specific primary test equipment 35, 45, 55 or 65 the preamble 31 is customized to include multiple 2-phase 16-symbol antipodal sequences and multiple 4-phase 16-symbol CAZAC (constant amplitude zero autocorrelation) sequences concatenating in a fashion that the source of the bursted test signal 22 can be quickly identified using the autocorrelation arithmetic. $R(k)$ is the autocorrelation function, well-known in the practice of detecting a signal; however, any sequence that possesses a peak at $R(0)$ and $10* \log 10(R(0)/R(k)) > 30$ to $40$ dB is applicable to this invention.

A 2-phase antipodal sequence $\{a_n\}$ of length 16 symbols is defined as $$a_n = 1 + (-1)^n * j,$$

$$j = \sqrt{-1}, n = 0, 1, 2, \ldots, 15$$

so that $\{a_n\} = \{1+j, -1-j, 1+j, -1-j, 1+j, -1-j, 1+j, -1-j, 1+j, -1-j, 1+j, -1-j, 1+j, -1-j, 1+j, -1-j\}$.

The transition rich property of an antipodal sequence makes it the best candidate for symbol timing acquisition.

A 4-phase CAZAC sequence $\{c_n\}$ of length 16 symbols can be generated by $$C_{4*k+l} = j^{k*l}, j = \sqrt{-1},$$

$$n = 4*k+l, k = 0, 1, 2, 3, \text{ and } l = 0, 1, 2, 3.$$

The generated CAZAC sequence $\{c_n\} = \{1, 1, 1, 1, 1, j, -1, -j, 1, -1, 1, -1, 1, -j, -1, j\}$.

The CA (constant amplitude) property of the CAZAC sequence enables the conversion from a 4-phase CAZAC sequence into a QPSK sequence. The corresponding QPSK sequence $\{q_n\}$ of $\{c_n\}$ is also a 4-phase CAZAC sequence and can be obtained as the following sequence by replacing 1 with $1+j$, replacing $-1$ with $-1-j$, replacing $j$ with $-1+j$, and replacing $-j$ with $1-j$.

$$\{q_n\} = \{1+j, 1+j, 1+j, 1+j, 1+j, -1+j, -1-j, 1-j, 1+j, -1-j, 1+j, -1-j, 1+j, 1-j, -1-j, -1+j\}$$

Figure 12:
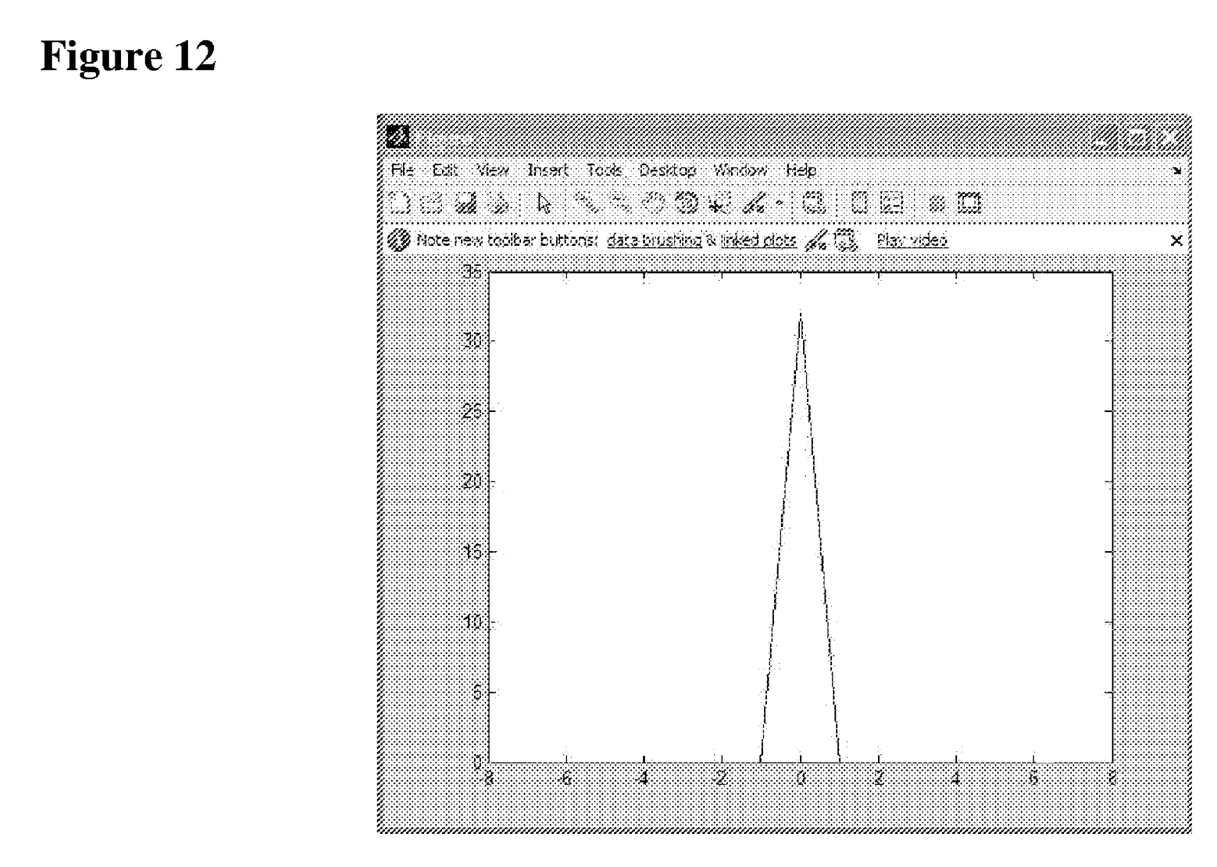
FIG. 12 illustrates a correlation spike for identifying the origin of the test signal.

The ZAC (zero autocorrelation) property of the CAZAC sequence shown in FIG. 12 increases the correctness of identification under noisy environment.

Figure 13:
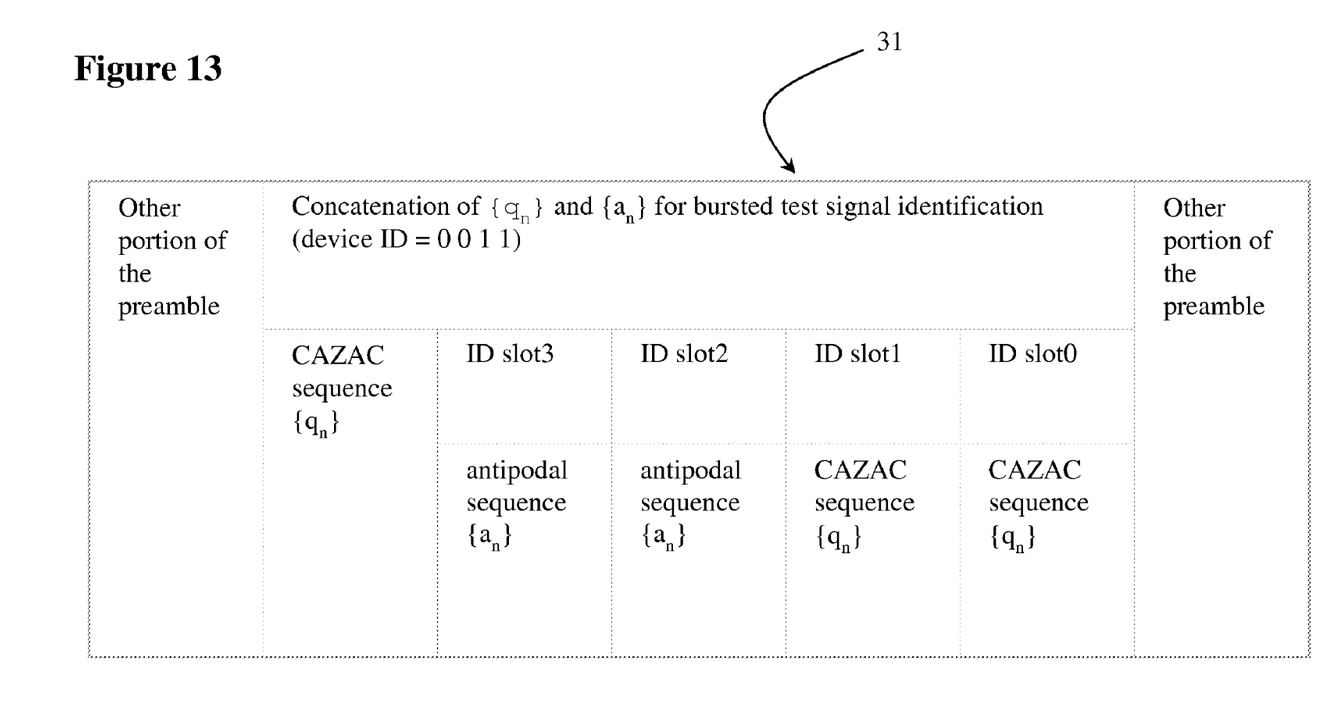
FIG. 13 illustrates the preamble of the test signal of FIG. 11.

The structure of the customized preamble 31 and the concatenation of CAZAC sequences and antipodal sequences for identifying the bursted test signal 22 are shown in FIG. 13. Before transmitting the bursted test signal 22 the primary test equipment 35, 45, 55 or 65 has to assign its device ID bits to the corresponding ID slots in the customized preamble 31. The antipodal sequence is assigned to an ID slot if its corresponding device ID bit is 0 Likewise, if a device ID bit is 1 the corresponding ID slot should be filled with the CAZAC sequence. The first CAZAC sequence in front of ID slot 3 is used as the reference to identify the bursted test signal 21. In the example in FIG. 13 a configuration of four ID slots allows up to fifteen different primary test equipment 35, 45, 55 or 65 transmitting bursted test signals 22 upstream. The ID=0 0 0 0 is reserved for unrecognizable device.

The bursted test signal 22 from a specific primary test equipment 35, 45, 55 or 65 can then be identified based on at which ID slot the autocorrelation spike occurs by correlating the received IF waveform of the reference CAZAC sequence with the received IF waveforms in all the ID slots.

The test signals 22 are not limited to the current CMTS 4 upstream configuration. Simply using the CMTS 4 as the time keeper will allow the test cable modem 35, 45, 55 or 65 to transmit at any one frequency or at a plurality of different frequencies in the upstream, in particular those frequencies that are unused. The test signal collection unit 20 (in previous incarnations known as a sweep receiver) is tunable to different frequencies to test the entire frequency response of the upstream band, thereby replacing the current method of sweep. There are several methods that may be applicable for sweep, including; 1) a chirp-z pulse; 2) several tones at the same time to cover the frequency range under test; and 3) a swept tone, discrete steps of frequency over time.

Not only would the device be able to measure amplitude response, but the test signals can be constructed in such a way that relative group delay can be determined as well. Current test equipment is not capable of displaying this information. Using either the chirp-Z pulse or the several tones at the same time, the phase delta of frequencies can be measured and converted to group delay.

We claim:

1. A method of testing an upstream DOCSIS channel with a test signal transmitted within mini-slots allocated for contention transmission or data PDUs during normal operation of a cable modem in transmission to a CMTS comprising:
   a) generating the test signal with a testing device including a cable modem;
   b) sending a request signal to the CMTS using the cable modem for as many mini-slots in the DOCSIS upstream channel as required to send the test signal;
   c) receiving a map PDU from the CMTS with details of a map, within which is a data grant for the mini-slots requested in step b);
   d) transmitting the test signal in the mini-slots granted by the CMTS;
   e) receiving the test signal at a test signal collection unit; and
   f) performing tests using the test signal;
   wherein the test signal comprises a preamble, a message, and a test pattern
   wherein the preamble comprises a reference sequence, and a plurality of ID slots, each ID slot for storage of a test sequence indicative of the identification of the testing device; and
   wherein step e) includes identifying the test device by autocorrelating the test sequence in the ID slots with the reference sequence.

2. The method according to claim 1, wherein the reference sequence and the test sequence are CAZAC sequences.

3. The method according to claim 1, wherein the testing device includes a DOCSIS chip set and a CPU; and wherein the DOCSIS chip set modifies parameters of DOCSIS contention and data PDU bursts to generate the test signal when the mini-slots are granted.

4. The method according to claim 1, wherein the testing device includes a DOCSIS chip set, a CPU, and an upstream test signal generator; wherein the DOCSIS chip set requests and detects time slots; and wherein the DOCSIS chip set signals the upstream test signal generator to transmit the test signal.

5. A method of testing an upstream DOCSIS channel with a test signal transmitted within mini-slots allocated for contention transmission or data PDUs during normal operation of a cable modem in transmission to a CMTS comprising:
   a) generating the test signal with a testing device including a cable modem;
   b) sending a request signal to the CMTS using the cable modem for as many mini-slots in the DOCSIS upstream channel as required to send the test signal;
   c) receiving a map PDU from the CMTS with details of a map, within which is a data grant for the mini-slots requested in step b);
   d) transmitting the test signal in the mini-slots granted by the CMTS;
   e) receiving the test signal at a test signal collection unit; and
   f) performing tests using the test signal;
   wherein the testing device includes a DOCSIS chip set, a CPU, a QAM demodulator, and an upstream test signal generator;
   wherein the DOCSIS chip set acquires the nominal upstream channel parameters and requests data PDU slots; and
   wherein the QAM demodulator captures the upstream timing and the map PDU and generates the timing signal for the upstream test signal generator, which transmits the test signal.

6. The method according to claim 5, wherein the test signal comprises a preamble, a message, and a test pattern.

7. The method according to claim 6, wherein the preamble comprises a reference sequence, and a plurality of ID slots, each ID slot for storage of a test sequence indicative of the identification of the testing device; wherein step e) includes identifying the test device by autocorrelating the test sequence in the ID slots with the reference sequence.

8. A method of testing an upstream DOCSIS channel with a test signal transmitted within mini-slots allocated for contention transmission or data PDUs during normal operation of a cable modem in transmission to a CMTS comprising:
   a) generating the test signal with a testing device including a cable modem;
   b) sending a request signal to the CMTS using the cable modem for as many mini-slots in the DOCSIS upstream channel as required to send the test signal;
   c) receiving a map PDU from the CMTS with details of a map, within which is a data grant for the mini-slots requested in step b);
   d) transmitting the test signal in the mini-slots granted by the CMTS;
   e) receiving the test signal at a test signal collection unit; and
   f) performing tests using the test signal;
   wherein the testing device includes a QAM demodulator, an upstream test signal generator, and a CPU; and
   wherein the QAM demodulator captures the map PDU and generates the timing signal for the upstream test signal generator, which transmits the test signal.

9. The method according to claim 8, wherein step a) includes generating portions of the test signal at different frequencies; and wherein step f) includes testing a frequency response of the upstream channel band.

10. The method according to claim 9, wherein step a) includes generating portions of the test signal at unused frequencies of the upstream channel.

11. A method of testing an upstream DOCSIS channel with a test signal transmitted within mini-slots allocated for contention transmission or data PDUs during normal operation of a cable modem in transmission to a CMTS comprising:
    a) generating the test signal with a testing device including a cable modem;
    b) sending a request signal to the CMTS using the cable modem for as many mini-slots in the DOCSIS upstream channel as required to send the test signal;
    c) receiving a map PDU from the CMTS with details of a map, within which is a data grant for the mini-slots requested in step b);

d) transmitting the test signal in the mini-slots granted by the CMTS;

e) receiving the test signal at a test signal collection unit; and f) performing tests using the test signal;

wherein step e) includes calculating the RMS power within the frequency band occupied by the test signal; and feeding the RMS power value into a state machine.

12. The method according to claim 11, wherein step e) includes:

i) waiting for the power level to drop below a specified threshold;

ii) seeding a first countdown timer with the value Min Low Time; and continuing to monitor the power level, if the power level exceeds the specified threshold, then return to i), otherwise, wait for the first countdown timer to expire and proceed iii);

iii) monitor the power level and proceed to iv) when the power level exceeds the specified threshold;

iv) seeding a second countdown timer with the value Min Burst Time; and continuing to monitor the power level, if the power level drops below the specified threshold then return i), otherwise, wait for the second countdown timer to expire and proceed to v);

v) seeding a third countdown timer with the value Max Burst Time-Min Burst Time, and continuing to monitor the power level, if the power level drops below the specified threshold then proceed to vi), if the third countdown timer expires then return to i);

vi) seeding a fourth countdown timer with the value Min Low Time", and continuing to monitor the power level, if the power level exceeds the specified threshold then return to i), otherwise, wait for the fourth countdown timer to expire and proceed vii); and vii) signaling that a bursted signal of the desired width has been detected.

13. A method of testing an upstream DOCSIS channel with a test signal transmitted within mini-slots allocated for contention transmission or data PDUs during normal operation of a cable modem in transmission to a CMTS comprising:

a) generating the test signal with a testing device including a cable modem;

b) sending a request signal to the CMTS using the cable modem for as many mini-slots in the DOCSIS upstream channel as required to send the test signal;

c) receiving a map PDU from the CMTS with details of a map, within which is a data grant for the mini-slots requested in step b);

d) transmitting the test signal in the mini-slots granted by the CMTS;

e) receiving the test signal at a test signal collection unit; and f) performing tests using the test signal;

wherein step f) comprises determining relative group delay of the upstream channel.

* * * * *